US011132839B1

(12) United States Patent
White et al.

(10) Patent No.: US 11,132,839 B1
(45) Date of Patent: Sep. 28, 2021

(54) SYSTEM AND METHOD FOR INTEGRATING REAL PROPS INTO VIRTUAL REALITY AMUSEMENT ATTRACTIONS

(71) Applicants: Daryl White, Windermere, FL (US); Peter R. Schnabel, Victoria (CA); Christopher David Glen Robertson, Victoria (CA); Joanne Parker Robertson, Victoria (CA)

(72) Inventors: Daryl White, Windermere, FL (US); Peter R. Schnabel, Victoria (CA); Christopher David Glen Robertson, Victoria (CA); Joanne Parker Robertson, Victoria (CA)

(73) Assignee: DREAMCRAFT ATTRACTIONS LTD., Victoria (CA)

(*) Notice: Subject to any disclaimer, the term of this patent is extended or adjusted under 35 U.S.C. 154(b) by 0 days.

(21) Appl. No.: 15/083,274

(22) Filed: Mar. 28, 2016

Related U.S. Application Data

(63) Continuation-in-part of application No. 15/083,257, filed on Mar. 28, 2016, now Pat. No. 9,933,624, and a continuation-in-part of application No. 15/057,141, filed on Mar. 1, 2016, now Pat. No. 9,778,467.

(51) Int. Cl.
| | | |
|---|---|---|
| *A63G 31/16* | (2006.01) |
| *G06T 19/00* | (2011.01) |
| *G06T 1/20* | (2006.01) |
| *G06K 19/07* | (2006.01) |
| *G06K 7/10* | (2006.01) |
| *A63G 31/02* | (2006.01) |
| *G02B 27/01* | (2006.01) |

(52) U.S. Cl.
CPC ............ *G06T 19/006* (2013.01); *A63G 31/02* (2013.01); *G02B 27/0176* (2013.01); *G06K 7/10415* (2013.01); *G06K 19/0723* (2013.01); *G06T 1/20* (2013.01); *G02B 2027/0169* (2013.01)

(58) Field of Classification Search
CPC .................................................... G06T 19/006
USPC ......................................................... 345/633
See application file for complete search history.

(56) References Cited

U.S. PATENT DOCUMENTS

| | | | | |
|---|---|---|---|---|
| 5,138,555 A * | 8/1992 | Albrecht | .............. | G02B 27/017 340/980 |
| 5,490,784 A * | 2/1996 | Carmein | ................ | A63B 22/02 434/29 |
| 6,007,338 A * | 12/1999 | DiNunzio | ................ | G09B 9/02 345/672 |
| 10,856,796 B1 * | 12/2020 | Berme | ..................... | G06F 3/012 |
| 2015/0097863 A1 * | 4/2015 | Alaniz | .................. | G06T 19/006 345/633 |
| 2015/0097864 A1 * | 4/2015 | Alaniz | ..................... | G06T 7/20 345/633 |

(Continued)

Primary Examiner — Javid A Amini
(74) Attorney, Agent, or Firm — Tomlinson McKinstry, P.C.

(57) ABSTRACT

A system and method for allowing riders of virtual reality rides to enjoy and interact with real world props in a virtual reality environment while at an amusement park ride. The system stores and displays to the rider virtual representations of the tagged items they've brought along for the amusement park ride. Smart merchandise utilizes RFID tags along with a database of virtual characteristics to enable the virtual world representation of real world items.

13 Claims, 3 Drawing Sheets

(56) References Cited

U.S. PATENT DOCUMENTS

| | | | |
|---|---|---|---|
| 2015/0269780 A1* | 9/2015 | Herman | A63F 13/26 345/633 |
| 2015/0325027 A1* | 11/2015 | Herman | A63F 13/428 345/633 |
| 2015/0363976 A1* | 12/2015 | Henson | H04N 13/279 345/419 |
| 2016/0063767 A1* | 3/2016 | Lee | G06T 19/006 345/419 |

* cited by examiner

SYSTEM AND METHOD FOR INTEGRATING REAL PROPS INTO VIRTUAL REALITY AMUSEMENT ATTRACTIONS

This application is a continuation-in-part of U.S. patent application Ser. No. 15/057,141 filed 1 Mar. 2016, titled "Head Mounted Display;" & is a continuation-in-part of U.S. patent application Ser. No. 15/083,257 filed 28 Mar. 2016, titled "System and Method for Providing Individualized Virtual Reality for an Amusement Attraction;" all of which are hereby incorporated by reference for all purposes as if fully set forth herein.

BACKGROUND

1. Field of the Invention

The present invention relates generally to virtual reality rides for amusement/theme park attractions, and more specifically to a system and method for integrating real world props into a virtual reality environment of an amusement park ride.

2. Description of Related Art

Conventional souvenirs, such as hats, sunglasses, swords, lightsabers, gloves, and or cups, provide users with enjoyment while waiting to board rides, during meals, at home. Conventional souvenirs are typically prohibited from being utilized on amusement park rides as they create hazards if dropped during the ride. Furthermore, conventional souvenirs or props cannot be seen during rides utilizing virtual reality because of the virtual environment the ride exists in. While there are many systems for props in virtual reality environments well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
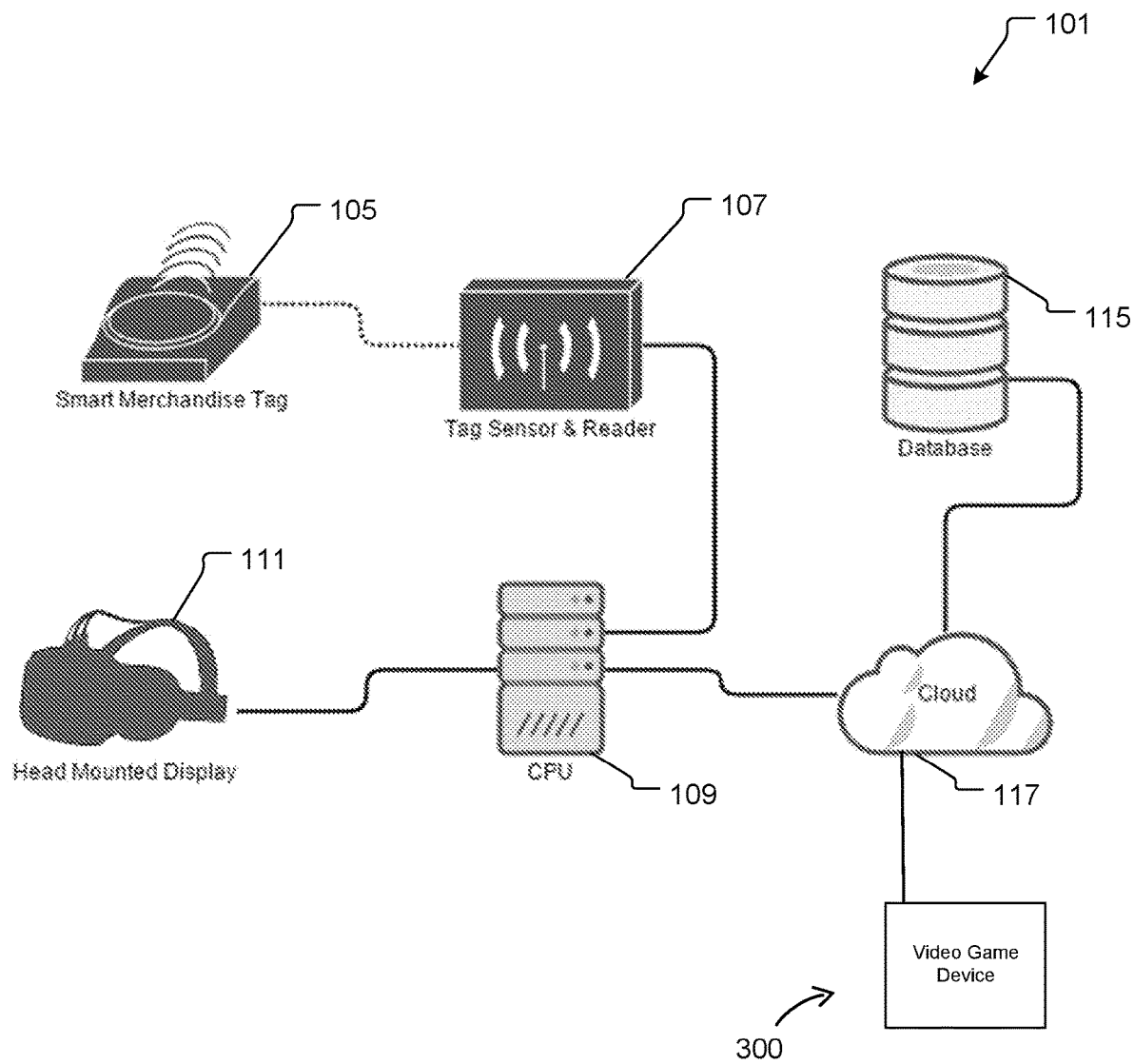
FIG. 1 is a block diagram of a system for integration of real props into an amusement attraction featuring virtual reality illustrated according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method for integrating real props into virtual reality amusement rides are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Riders of virtual reality amusement park rides can be transported to other worlds through the virtual reality environments they are exposed to. Providing riders with the ability to utilize items from the real world in the virtual world allows for each rider to experience the virtual reality environment in a different and custom way. Additionally, configuring the virtual reality environment to recognize real world props brought onto the virtual reality ride induce customers to purchase and retain souvenirs from the operators of the amusement park. Smart merchandise is a combination of tagged items and a corresponding virtual representation stored in a database. Smart merchandise provides users with a virtual use for a real world item.

Referring now to FIG. 1 in the drawings, a block diagram of a system and method of integrating real props into virtual reality amusement rides illustrated according to present application. System 101 is comprised of a plurality of tags 105, a tag reader 107, a virtual reality processor 109 or CPU, and a head mounted display 111. System 101 further comprises database 115 connected to the virtual reality processor 109 by a cloud based network 117.

Each prop or piece of smart merchandise is marked with a tag 105. Tag 105 is preferably a passive radio frequency identifier RFID chip with a unique number associated with the prop. For example, each color that an amulet came in would have a unique number. Alternatively, the tag 105 is a near field communication NFC chip. Furthermore, tag 105 can be an active tag with a built in battery in some embodiments.

The virtual reality amusement ride contains at least one tag reader 107. The tag reader 107 is located such that the system 101 can determine what real props the rider has brought along and therefore which virtual props the system should display to the rider. The tag reader 107 is located adjacent the rider so that the system 101 can isolate which real props are associated with each rider. For example, the control input or joystick can feature collocated tag readers 107. Each guest vehicle contains a sensor (for example: RFID or NFC reader) which is capable of detecting the presence of that encoding component, and also can retrieve the unique identifier encoded therein, for use by the interactive ride software. Furthermore, the vehicle or ride station contains multiple sensors or tag readers to enable the system to determine relative placement of the tagged prop on the rider. For example, a rider can wear a golden gauntlet on their right hand and a ruby gauntlet on their left hand. The system can determine the location of the specific prop by the plurality of tag readers located across the ride. It should be apparent that the tag readers can be on both the left and right sides of a chair or seat portion. In some embodiments a single tag reader will be sufficient, alternatively multiple tag readers provide more specific location information to the system. The more accurately the system can detect the smart merchandise, the more realistic the virtual representation will be.

Interactive ride software located on the virtual reality processor 109, which is executed independently by each vehicle's CPU, uses the unique identifier of the real prop to retrieve information from the database 115 containing all possible smart merchandise identifiers. From the retrieved database record, the identity of the smart merchandise is known, including type (examples: ring, amulet, gauntlet, bracelet, etc.), appearance, and also any virtual capability which the item bestows upon the wearer (for example, a certain bracelet could allow the guest to cast a special fireball with unique consequence or power within the virtual world). The interactive ride software, in the course of rendering the experience for each guest, includes in that rendering a virtual depiction of all detected smart merchandise items, and also includes the special capabilities entailed by possessing the items. Storage of the virtual representation of each tagged item in the cloud connected database allows for users to access their virtual representations of their products at amusement parks located around the world. Since the tagged item's details are stored in the database, counterfeiting of official amusement park souvenirs is reduced as the unauthorized items will not have a record in the database.

Furthermore, users are able to modify the virtual representations of their items while at home. For example, a tagged crown can be played with away from the amusement park during a video game session at home 300, experience points and virtual decorations applied to the tagged crown at home will be stored in the database for use at the amusement park.

Also, additional satellite systems comprising of a virtual reality processor 109, a display 310, a tag reader 207, and a camera 312 can be located in the line for the virtual reality ride. For example, riders can position themselves in front of a display 310 having the camera 312 facing them. The tag reader 207 detects which tagged items 215 the rider has and displays the virtual condition of the item to the rider on the display 310. Furthermore, the rider can adjust and change the virtual details of the item if so desired. For example, an amulet can provide additional lives in the ride or more shields dependent upon the rider's selection while waiting to board the ride.

Figure 2:
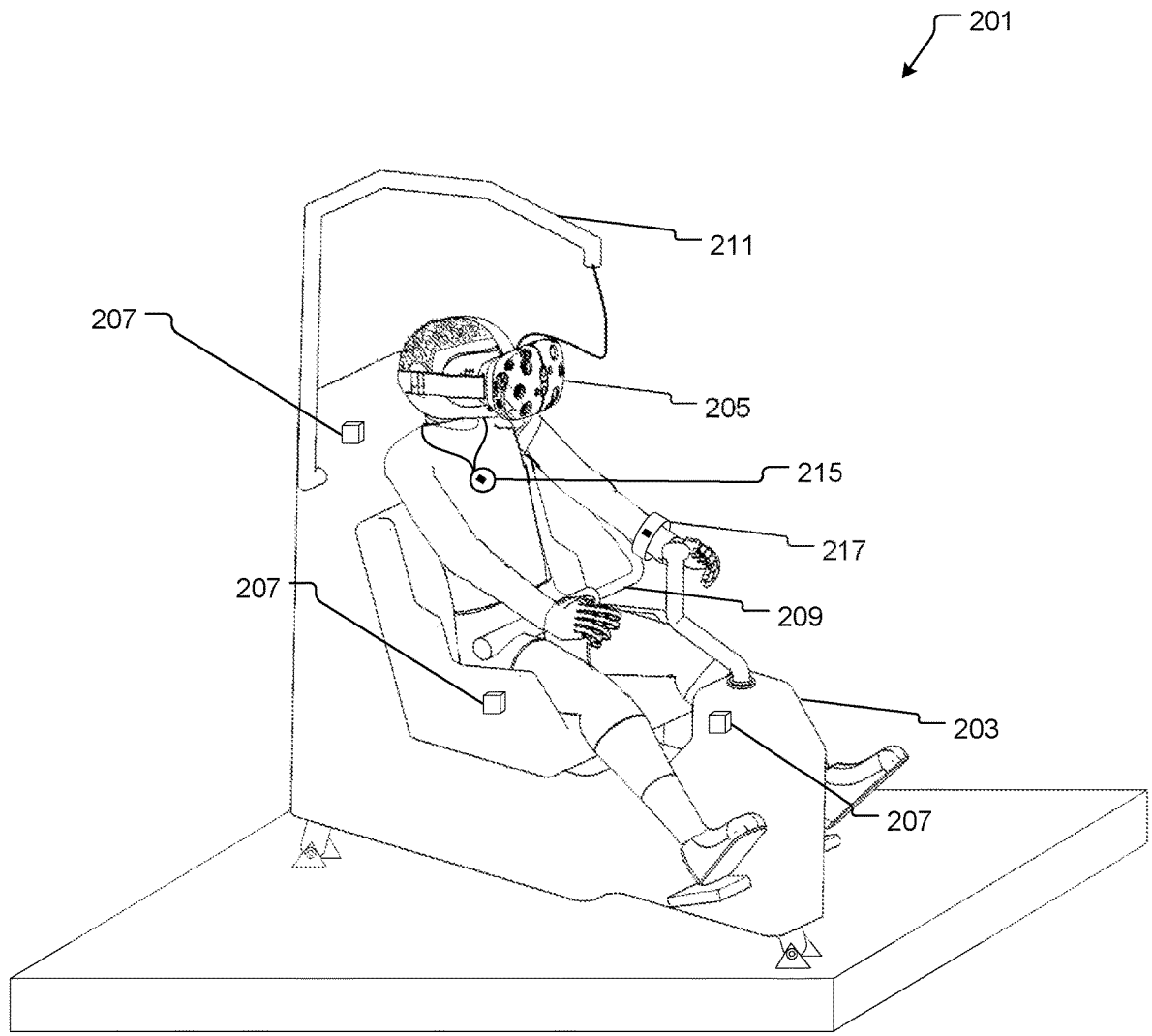
FIG. 2 is a perspective view of a system for integration of real props into an amusement attraction featuring virtual reality illustrated according to the present application.
Figure 3:
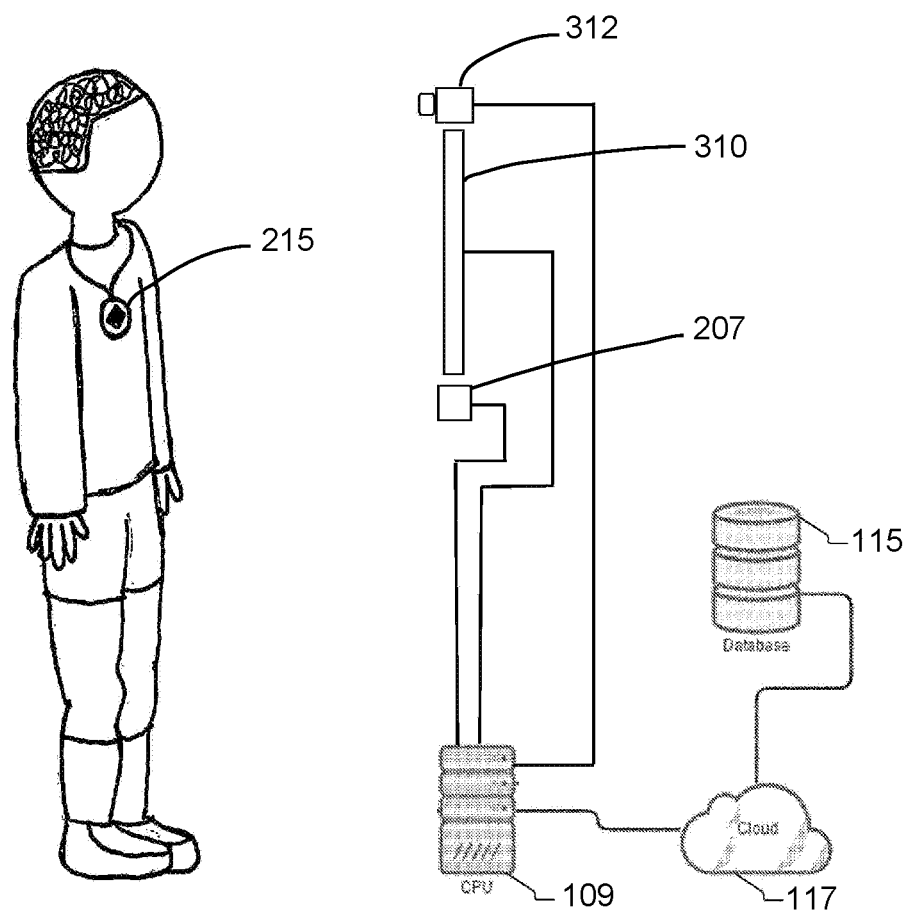
FIG. 3 is a schematic representation of a satellite system embodiment of the present invention for locating in the line for the virtual reality ride.

Referring now also to FIG. 2 in the drawings, a perspective view of a system and method of integrating real props into virtual reality amusement rides illustrated according to present application. System 201 is comprised of a motion base 203, a head mounted virtual reality display 205, a plurality of tag readers 207, a restraint system 209, and a hanger system 211. System 201 further comprises an amulet 215 and a bracelet 217. Amulet 215 contains a first tag and bracelet 217 contains a second tag. The first tag of amulet 215 is different that the second tag of the bracelet 217. A virtual reality processor displays a virtual reality environment to the rider on the display 205. The virtual reality processor utilizes the ride's control input to allow the user to move the motion base 203 in the virtual environment. The virtual reality processor, in conjunction with rendering software, utilizes the tag readers 207 to determine which props or smart merchandise the rider is wearing in conjunction with the database. The virtual reality processor displays to the rider virtual representations of the props the rider is wearing. For example, as the rider waves their arm in the real world, the virtual rider is waving their arm and is wearing a virtual bracelet like bracelet 217.

The system and method of providing virtual representations of real props into virtual reality amusement park rides provides benefits not found in conventional souvenirs. First, riders are able to uniquely interact with the virtual ride and customize their appearance in the virtual reality environment. Second, tagged souvenirs do not need to be left behind while riding the ride as they become an integral part of the experience. Third, the tagged props reduce counterfeiting as only official authorized tagged props will work with the system. Fourth, users are able to be entertained before the ride while in the line as the satellite systems display the virtual representations to the riders while waiting in the line.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for integrating a real-world prop item associated with a rider, into a virtual reality amusement ride, comprising:
   a real-world prop item having a tag;
   a virtual reality processor;
   a motion base;
   a virtual reality display;
   at least a first tag reader located on the motion base and configured to sense a tag;
   a database for storing information of the tag; and
   a connection between the virtual reality processor and each of: the virtual reality display, the at least first tag reader, and the database;
   wherein, the virtual reality processor is configured to transmit in virtual reality data transmitted to the virtual reality display, a virtual rendering of the real-world prop item corresponding to information of the tag.

2. The system according to claim 1, wherein the virtual rendering of the real-world prop item includes a virtual capability that the prop item bestows on the rider.

3. The system according to claim 1, wherein the connection between the database and the virtual reality processor is cloud based.

4. The system according to claim 1, wherein the motion base comprises:
   a seat;
   a control input; and
   a hanger configured to support the virtual reality display over a head of the user.

5. The system according to claim 4, further comprising:
   at least a second tag reader located on the motion base;
   wherein at least two of the tag readers are located on the seat; and
   wherein, the virtual reality processor is configured to determine a rider position for the real-world prop item and include the rider position in the virtual rendering of the real-world prop item.

6. The system according to claim 4, wherein at least one of the plurality of tag readers is located on the control input.

7. A method of integrating a real-world prop item into a virtual reality amusement park ride comprising:
- tagging a real-world prop item;
- creating a virtual representation of the real-world prop item in a database;
- detecting the real-world prop item with a tag reader;
- accessing the database; and
- displaying the virtual representation of the real-world prop item to a rider.

8. The method according to claim 7 further comprising:
- locating a plurality of tag readers across a motion base
- determining a rider position for the prop item using tag data received from the tag readers; and
- including the rider position in the virtual representation of the real-world prop item.

9. The system of claim 3, wherein the information of the tag in the database is prop-item-owner accessible via the cloud.

10. The system of claim 9, wherein the information of the tag in the database is prop-item-owner alterable.

11. The system of claim 1, further comprising a satellite system, ancillary to the virtual reality amusement ride, the satellite system comprising:
- a satellite tag reader;
- a satellite display;
- a satellite virtual reality processor; and
- a connection between the satellite virtual reality processor and each of: the satellite display, the satellite tag reader, and the database;
- wherein, the satellite virtual reality processor is configured to cause a virtual condition of the real-world prop item having the tag to be displayed on the display.

12. The system of claim 11, wherein the satellite system further comprises:
- a camera; and
- a connection between the satellite virtual reality processor and the camera;
- wherein the virtual reality processor is configured to process images received from the camera and cause the processed images to be displayed on the display.

13. A method of using the system of claim 1, comprising:
- sensing the tag with the first tag reader;
- retrieving the information of the tag; and
- displaying in the virtual reality display, the virtual rendering of the real-world prop item.

* * * * *